United States Patent [19]

Kao

[11] Patent Number: 5,536,102
[45] Date of Patent: Jul. 16, 1996

[54] LOCKING MECHANISM FOR BICYCLE HEAD TUBE

[76] Inventor: Yu-Chen Kao, 2 Alley 1, Lane 29, Sec. 2, Pei-Shin Rd., Shin-Tein City, Taipei Hsien, Taiwan

[21] Appl. No.: 372,338

[22] Filed: Jan. 13, 1995

[51] Int. Cl.⁶ ................................................. B62K 21/12
[52] U.S. Cl. ..................... 403/320; 403/370; 403/386; 403/409.1; 403/DIG. 9; 74/551.3
[58] Field of Search .................................. 403/320, 370, 403/386, 409.1, 196, 195, DIG. 9; 74/551.3

[56] References Cited

U.S. PATENT DOCUMENTS

| | | | |
|---|---|---|---|
| 919,542 | 4/1909 | Dain | 403/370 X |
| 1,436,347 | 11/1922 | Krider | 403/370 X |
| 1,880,894 | 10/1932 | Dorman | 403/320 |
| 2,046,942 | 7/1936 | Goeller | 403/370 X |
| 3,958,888 | 5/1976 | Mullenberg | 403/370 X |
| 3,972,635 | 8/1976 | Peter et al. | 403/370 X |
| 4,354,399 | 10/1982 | Katayama | 74/551.3 X |
| 4,529,332 | 7/1985 | Glabiszewski | 403/DIG. 9 X |

FOREIGN PATENT DOCUMENTS

| | | | |
|---|---|---|---|
| 111606 | 4/1962 | Pakistan | 403/370 |
| 178203 | 2/1962 | Sweden | 403/370 |
| 1405715 | 9/1975 | United Kingdom | 403/370 |

*Primary Examiner*—Terry Lee Melius
*Assistant Examiner*—Christopher J. Novosad
*Attorney, Agent, or Firm*—Bacon & Thomas

[57] ABSTRACT

A locking mechanism for the head tube of a bicycle in which the two ends of the head tube are respectively provided with a horizontal race and a vertical race. The horizontal race is provided for the handlebar to feed through, and the vertical race cooperates with a vertical tube for locking. The wall of the vertical race is provided with a feed-through lateral passage, which communicates with the vertical race through an intersecting hole. A stop member is placed inside the intersecting hole, and the two sides of the stop member are respectively provided with a push member. The side of the stop member facing the vertical race is provided with a recessed arc surface, and the opposite side is a V-shaped protruded portion, which is provided with a fixed ring. The two push members are respectively provided with a screw hole for a stove bolt to feed through so that the fixed ring can be locked together. The inner surfaces of the push members are slanted surfaces which correspond to the V-shaped protruded portion of the stop member therefore the stop member can be pushed toward the vertical race, allowing the stop member to push against the vertical tube for retaining.

3 Claims, 4 Drawing Sheets

LOCKING MECHANISM FOR BICYCLE HEAD TUBE

BACKGROUND OF THE INVENTION (a) Field of the Invention

The present invention relates to a locking mechanism for the head tube of a bicycle, particularly one using a stop member to cooperate with two push members so that the vertical tube can be locked together tightly with the head tube.

(b) Description of the Prior Art

A conventional design of the locking mechanism for the tube of a bicycle is shown in FIG. 5. The mechanism uses a push plate 10 (the back of which is provided with a cylindrical body 101 having slanted surface) to cooperate with a push member 20 (also formed with slanted surface) and a bolt 30. When the bolt 30 is fastened, the push member 20 pulls downward, thus the slanted surface of the push member 20 comes in contact with the slanted surface of the cylindrical body 101 of the push plate 10, allowing the push plate 10 to push forward for locking. However, the force from the bolt to the push plate 10 comes from a vertical direction, thus it is distributed and cannot be applied efficiently. Also, the force cannot be uniformly applied.

Another type of conventional locking mechanism for the head tube of a bicycle is shown in FIG. 6. The bottom side wall of the vertical race 401 of the head tube 40 is provided with a groove for a holding member 50 to be placed therein, and a bolt 60 is used for locking. When the bolt 60 is fastened, the holding member 50 is pulled upward, allowing the side of the holding member 50 to move forward to come in contact with the vertical tube. However, this structure also uses a unique holding member and there is no assurance that the holding member will move upward. Therefore, a minor offset of the holding member will cause it to come in contact with the vertical tube, causing the locking force to be applied to a single point.

SUMMARY OF THE INVENTION

The main object according to the present invention is to provide a locking mechanism for the head tube of a bicycle. The structure consists of a stop member, two push members and a stove bolt. The stop member is squeezed by the two push members on both sides, thus the stop, member is pushed forward by a uniform force to come in solid contact with the vertical tube, allowing the vertical tube to be secured with the head tube.

Another object according to the present invention is to provide a locking mechanism for the head tube of a bicycle in which the push member on one side can be provided with more than one screw hole. Thus when the head tube needs to be disengaged from the vertical tube,i the stove bolt can be first loosened, and a bolt can be fastened into any of the additional screw holes to disengage the push members. This is to prevent the retaining of the push members and to assure easy removal of the vertical tube.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
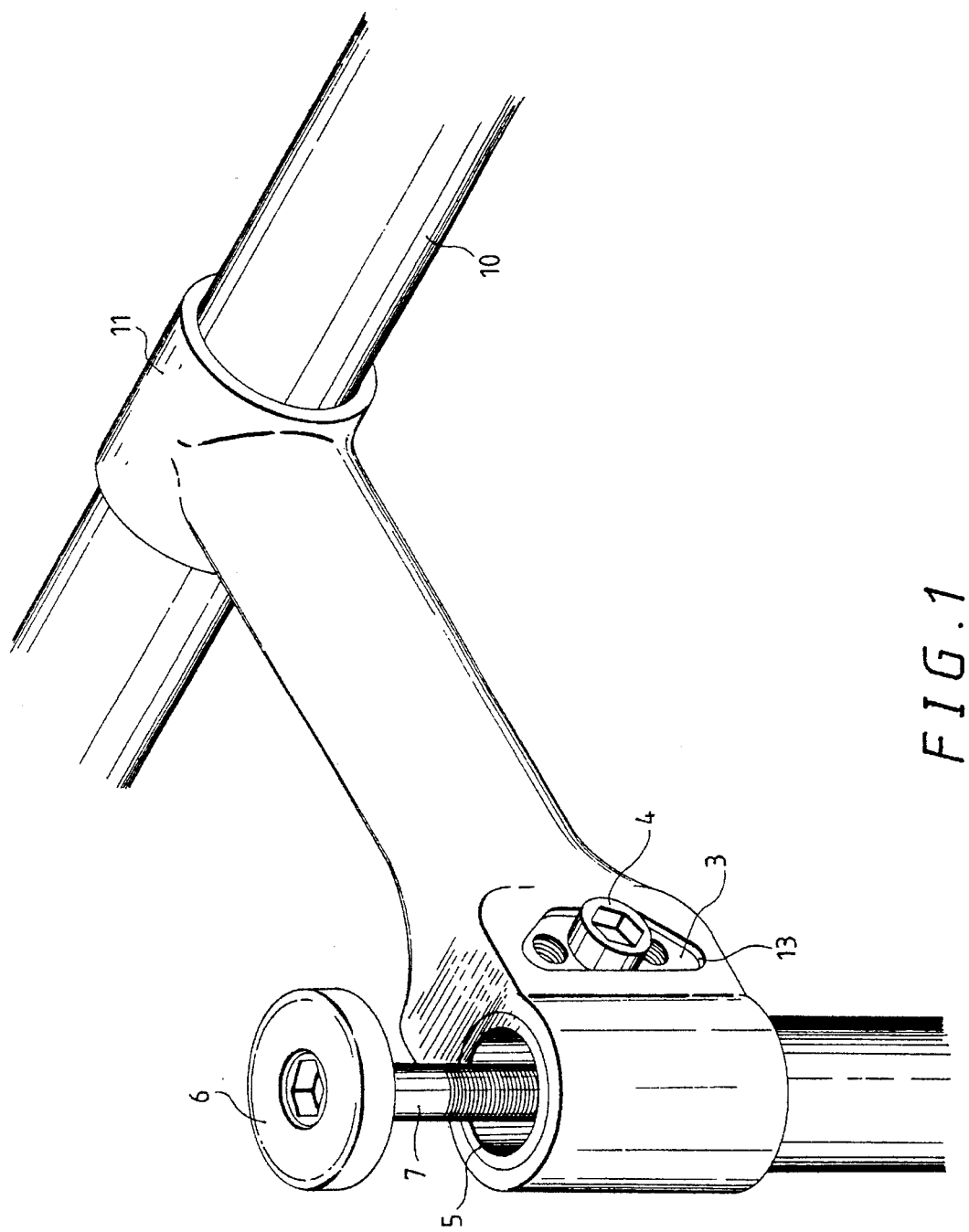
FIG. 1 is an assembly showing the locking mechanism of the head tube according to the present invention.
Figure 2:
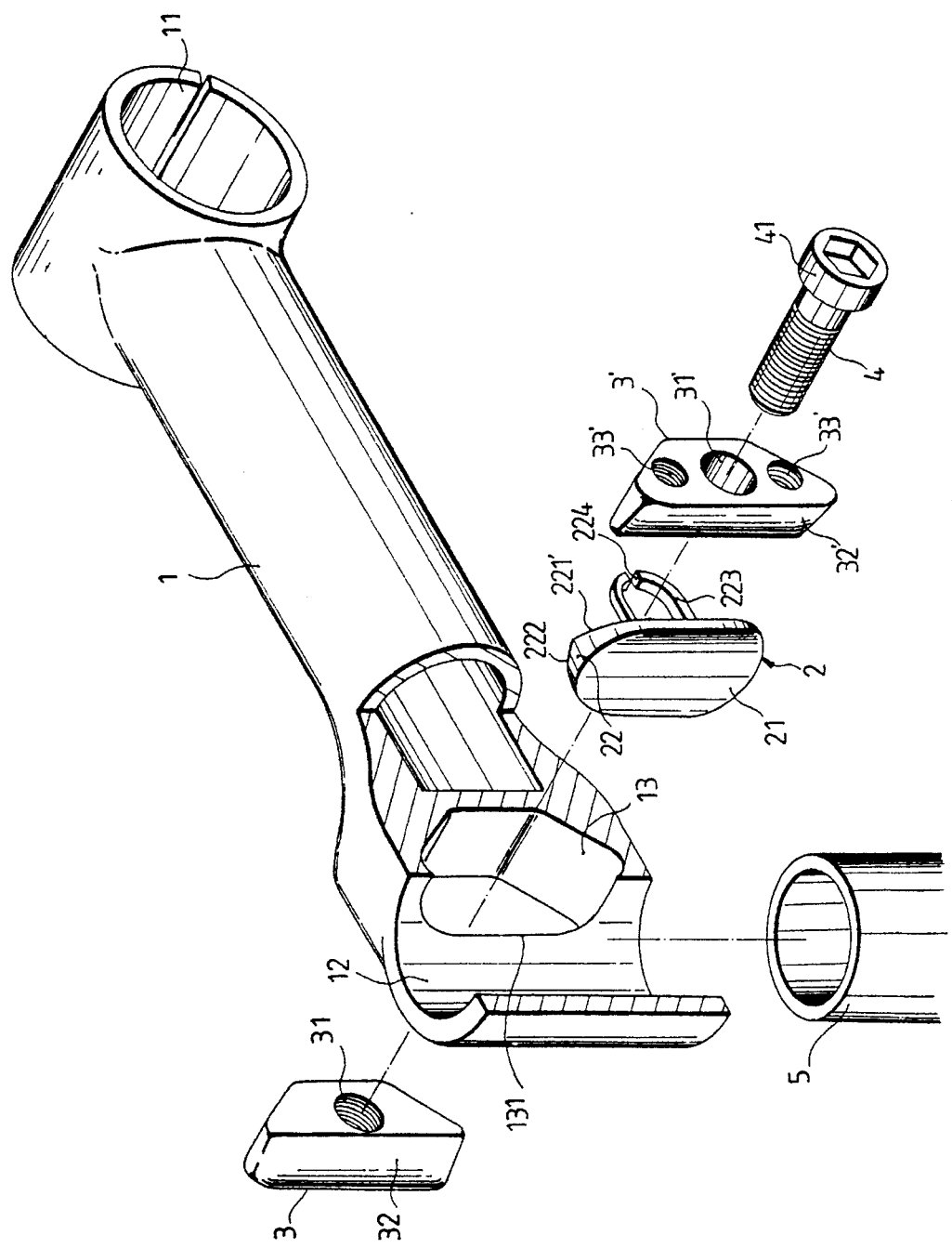
FIG. 2 is a perspective exploded view according to the present invention.

As shown in FIGS. 1 and 2, the locking mechanism for the head tube of a bicycle according to the present invention is designed such that the two ends of head tube 1 are respectively provided with a horizontal race 11 and a vertical race 12. The horizontal race 11 is provided for a handlebar 10 to feed through and integrate together, it is not a feature of the invention and will not be described in further detail. The wall of the vertical race 12 is provided with a feed-through lateral passage 13, and an intersecting hole 131 is provided therein. The intersecting hole 131 is provided so that the vertical race 12 and lateral passage 13 can communicate with each other. In addition, the feed-through lateral passage 13 is also provided with a stop member 2, two push members 3 and 3' and a stove bolt 4 for fastening.

Stop member 2 is substantially flat in shape, and fits into the intersecting hole 131, with the side facing the vertical race 12 being provided with a recessed arc surface 21 for a close contact with a vertical tube 5. The other side is a V-shaped protruded portion 22, which is formed by two corresponding slanted surface is 221 and 221'. The apex of the V-shaped protruded portion 22 is provided with a fixed ring 223.

The two push members 3 and 3' are formed of appropriate shape, the centers of which are respectively provided with screw holes 31 and 31'. Screw hole 31 is threaded while screw hole 31' is unthreaded; The push members are respectively provided on each side of the stop member 2, and the inner surfaces facing the stop member 2 are provided with appropriate slanted surfaces 32 and 32'. The slanted surfaces 32 and 32' correspond to and come in close contact with the slanted surfaces 221 and 221' of the V-shaped protruded portion 22.

Stove bolt 4 is respectively fed through the screw holes of the push members 3, 3' and the fixed ring 223 of the stop member 2, the configuration is provided such that the stop member 2 is squeezed in between.

Figure 3:
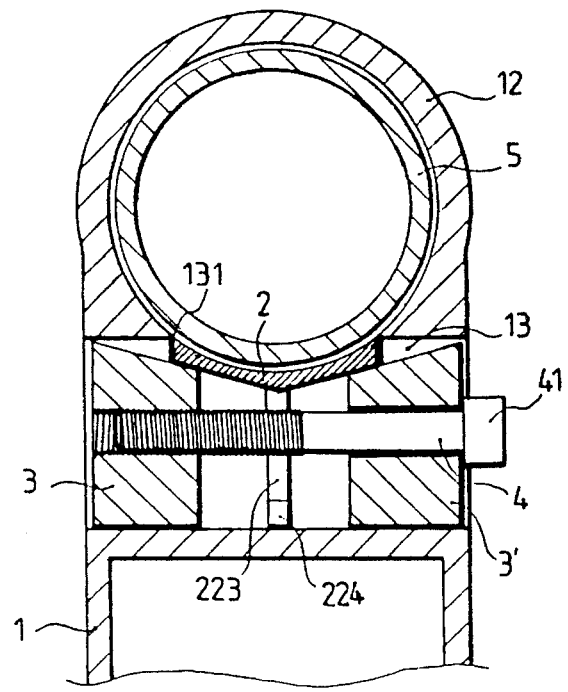
FIG. 3 is a cross sectional view of an assembly according to the present invention.
Figure 4:
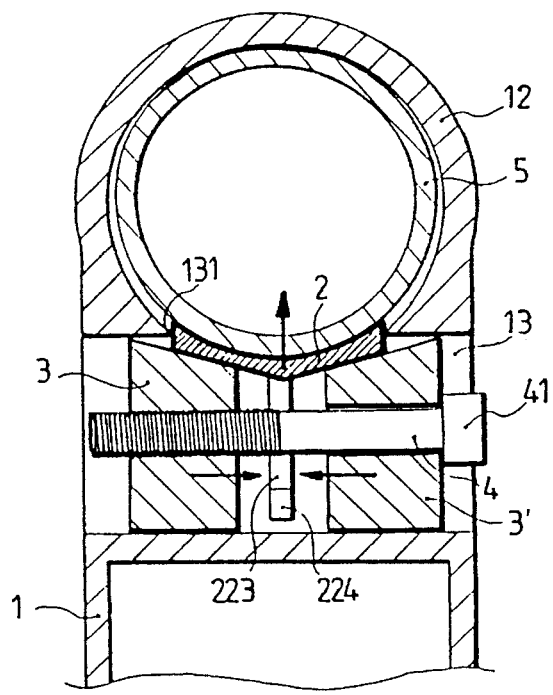
FIG. 4 is another cross sectional view illustrating the operation of the locking mechanism according to the present invention.
Figure 6:
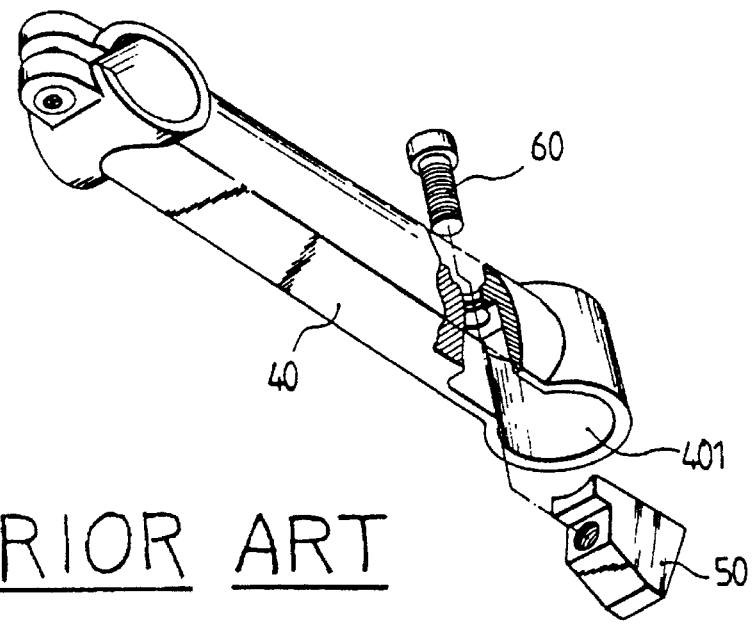
FIG. 6 is a perspective fragmented view of another type of conventional locking mechanism for the head tube of a bicycle.
Figure 5:
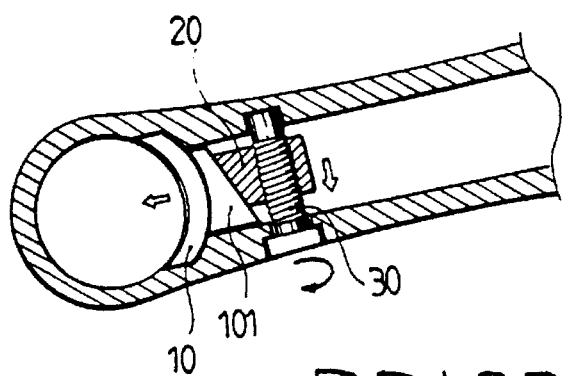
FIG. 5 is a sectional view of a conventional locking mechanism for the head tube of a bicycle.

With the above components, the two push members 3, 3' and the stop member 2 are placed in the feed-through lateral passage 13 of the head tube 1, and the stop member 2 is fitted inside the intersecting hole 131. The stove bolt 4 is fed through screw hole 31' and fixed ring 223 and retained therein through thread engagement in screw hole 31, as is shown in FIG. 3. Upon the placement of the vertical tube 5 through the vertical race 12, the stove bolt 4 can be tightened, allowing the outer push member 3 to be latched and pulled back in, while the inner push member 3' is pushed by the bolt head 41 toward the inner part, as is shown in FIG. 4. Thus the two push members 3 and 3' move inward, and the slanted surfaces 32 and 32' also produce an action along the V-shaped protruded portion 22 of the stop member 2. The stop member 2 now moves forward due to the application of two uniform forces, thus, the recessed arc surface 21 of the stop member 2 comes in uniform and stable contact with the wall of the vertical tube 5, providing a solid locking mechanism between the vertical tube 5 and the head tube 1. The force against the contacting surfaces is uniform and there is no need to concern about any offsetting.

In addition, the push member B' in the inner portion can further be provided with more than one screw hole 33', as is shown in FIG. 2. The additional screw holes 33' are mainly used for easy access of,the vertical tube 5. In order to remove the vertical tube 5, the stove bolt 4 must first be loosened. However, the two push members 3, 3' and the stop member 2 may be stuck together after a period of time, making it difficult to remove the vertical tube 5. For this reason appropriate bolts must be used (not shown in the drawing) and secured into the additional screw holes 33', so that the bolt can be pushed against the push member 3 on the other side, thus disengaging the push member 3. The vertical tube 5 can thereafter be removed without any resistance.

To complete the above configuration, one end of the vertical race 12 of the head tube 1 can be provided with a cap 6 and a bolt 7 (please refer to FIG. 1) for fastening. The cap 6 provides a seal to the assembly. However, this portion is not related to the feature of the invention, it is only one embodiment of the assembly. In addition, the annular wall of the fixed ring 223 of the stop member 2 can also be cut out to form a slit 224 (as shown in FIG. 3). The slit 224 will be used as a reserved space for the forward movement of the stop member 2, i.e., the fastening of the stove bolt 4 will not be restricted by the retaining of the fixed ring 223, finally, the push members 3 and 3' are squeezed and pushed to the apex of the V-shaped protruded portion 22, thus allowing the push member 2 to push tightly against the vertical tube 5.

It is understood that the forgoing description and accompanying illustrations are merely exemplary, and various changes and modifications to the preferred embodiments will be apparent to those skills in the art. The scope of this invention is defined solely by the appended claims and their equivalents.

What is claimed is:

1. A locking mechanism for securing a vertical tube to the head tube of a bicycle, the mechanism comprising:

a) a head tube including a first end formed with a vertical race and a second end formed with a horizontal race, the vertical race including a passage extending laterally therethrough and a hole intersecting the passage for providing communication between the vertical race and the passage;

b) a stop member disposed within the passage and extendable through the hole towards the vertical race, the stop member including a recessed are surface facing the vertical race for engaging a vertical tube received therein and a V-shaped protruded portion opposite the are surface, the protruded portion defined by a pair of surfaces slanting outwardly from an apex, and a ring fixed to the apex;

c) a pair of push members disposed within the passage on opposite sides of the stop member, said pair of push members comprising an outer push member and an inner push member, each push member including at least one screw hole formed therein and an inner slanted surface corresponding to and slidably engagable along a slanting surface of the stop member;

d) a threaded bolt extending through the screw holes of the push members and the ring of the stop member, the bolt being threadedly engaged with the outer push member; and e) wherein when the bolt is threaded into the outer push member, the push members are drawn inwardly into the passage towards the ring and the slanted surfaces of the push members slidably engage the slanting surfaces of the stop member to urge the stop member through the hole and into the vertical race against the vertical tube for applying uniform pressure against the vertical tube to lock same to the vertical race.

2. The locking mechanism of claim 1 wherein the inner push member further includes at least one additional screw hole for threaded engagement by an additional bolt to disengage the outer push member and permit removal of the vertical tube from the vertical race.

3. The locking mechanism of claim 1 wherein the ring further includes a slit formed therein.

\* \* \* \* \*